United States Patent

Lundsager

[15] 3,637,419
[45] Jan. 25, 1972

[54] METHOD OF COATING RIGID CORES AND PRODUCT THEREOF

[72] Inventor: Christian B. Lundsager, Ashton, Md.
[73] Assignee: W. R. Grace & Co., New York, N.Y.
[22] Filed: Nov. 24, 1969
[21] Appl. No.: 879,503

[52] U.S. Cl...............117/93.31, 117/132 R, 117/161 R, 117/161 UZ, 117/161 ZB, 117/94, 204/159.15, 204/159.23, 260/830 S, 260/79
[51] Int. Cl............................................B44d 1/50
[58] Field of Search........117/93.31, 161 R, 161 ZB, 161 UZ, 117/94, 132 R; 156/272, 446; 29/129.5, 130, 132; 118/409; 204/159.11, 159.22, 159.23, 159.15; 260/79, 830 S, 887, 874, 859 R

[56] References Cited

UNITED STATES PATENTS

| | | | |
|---|---|---|---|
| 1,182,982 | 5/1916 | Crump | 118/409 |
| 2,270,177 | 1/1942 | Vawryk | 118/409 |
| 3,369,922 | 2/1968 | Svrchek | 117/94 X |
| 3,506,626 | 4/1970 | Warner | 260/79 |
| 3,535,193 | 10/1970 | Prince | 117/93.31 X |

*Primary Examiner*—Alfred L. Leavitt
*Assistant Examiner*—J. H. Newsome
*Attorney*—Kenneth E. Prince

[57] ABSTRACT

Industrial rollers are prepared by photocuring a layer of photocurable composition on the rigid core and then photocuring a layer of diluted photocurable composition to obtain a smooth uniform glazelike finish. As the core cylinder is rotated, a thin layer of photocurable composition is fed intermittently or continuously onto the rotating cylinder, where it can optionally be smoothed by a doctor blade. The photocurable composition preferably is photocured by an ultraviolet light source which is located on the cylinder side opposite the place where the photocurable composition is applied so that premature hardening does not occur in the feed stock. Multiple, consecutive layers of photocurable composition can be built up on the rigid core, each (after the first) being placed upon a partially hardened photocured sublayer. In this manner, the photocured material on the rigid core can be built up to any desired and practical thickness. A solvent-diluted photocurable composition is then coated on the coated core and photocured to furnish the smooth glazelike finish. Toluene is the preferred solvent.

18 Claims, 3 Drawing Figures

3,637,419

METHOD OF COATING RIGID CORES AND PRODUCT THEREOF

OBJECTS OF THIS INVENTION

It is an object of this invention to prepare and apply coatings to rigid cores, when said coatings have uniform smooth glazelike finishes. Other objects will be obvious to those skilled in the art.

BROAD DESCRIPTION OF THE INVENTION

Industrial rollers can be prepared by the process described in copending patent application Ser. No. 879,175, inventors: Hubbard, B. W., Jr., and Kehr, C. L., filed Nov. 24, 1969, said process involving placing a layer of a photocurable composition on a revolving rigid core and photocuring the layer. This invention involves placing a glassy, uniform, smooth, defect-free surface on those rollers.

The basic rollers are made as follows: The cylinder is rotated at a relatively slow rate of speed, i.e., between about 1 r.p.m. and 50 r.p.m., or just below the speed at which centrifugal force, which depends on the diameter of the roller, begins to distort the coating before it is photocured. A thin layer of photocurable composition is fed onto the rotating cylinder, where it can optionally be smoothed by a doctor blade. Also, optionally, a pressure roller can be used to work the coating and squeeze out air pockets or other gas bubbles. Liquids of various viscosity ranges or thixotropic pastes are preferred but with suitable modifications of the feeding mechanism, semisolid or "solid" resinous or elastomeric photocurable compositions can also be handled; the main point is to select a photocurable composition which in the photocured state will have the desired physical properties and solvent resistance for the intended application that the roller will be used for. During the application of the photocurable composition to the rotating core, the photocurable composition is intermittently or preferably continuously photocured by an ultraviolet light source. Preferably, the U.V. light source is located on the cylinder side opposite the place where the photocurable composition is applied so that premature hardening does not occur in the feed stock which is maintained in the "shadow" cast by the core relative to the U.V. light source. Multiple consecutive layers of the same or different photocurable compositions can be placed on the rigid core, each (after the first) being located upon a partially or completely hardened photocured sublayer. In this manner the photocured material on the rigid core can be built up to any desired and practical thickness, say, for example, 2 inches or more. Each layer, as it is applied, will normally be between about 0.5 and about 125 mils in thickness although this is not critical and may vary greatly depending on the speed of rotation of the core, the viscosity of the photocurable composition, and the curing rate of the photosensitive material. The photocured surface on the roller, can if desired, be ground and buffed to help make an end product having an extremely smooth surface and an accurate cylindrical shape.

This invention involves similarly coating a solvent-diluted photocurable composition on the already partially photocured layer to produce a glossy, uniform, smooth finish. The process involves photocuring the solvent-diluted photocurable composition layer. The heat in the coated roller from the photocuring of the previous coating of photocurable composition is usually sufficient to cause evaporation of the majority of the solvent, and the small remaining amount of solvent evaporates during the subsequent photocuring and storage of the roller. There have been no indications by odor or softness of any harmful quantity of solvent in the photocured finish coating. So the process is, by way of summation, temporarily removing the photocuring radiation source (usually U.V. light), coating the roller with a layer of photocurable composition diluted with suitable solvent, allowing evaporation of solvent to leave a glossy layer of uncured photocurable composition, and photocuring that layer with a photocuring radiation source. The photocurable composition in the finishing layer is liquid itself or the solvent mixture within which it incorporated is liquid.

An advantage of this invention is that expensive molds or long heating cycles are not needed to coat a rigid core. The process of this invention is quick, convenient and economical, and produces a superior, fully cured product, which has an extremely smooth, glazelike surface without the need for grinding and buffing. Postfabrication curing or aging steps are not required, since the application and photocuring to completion (e.g., to constant final physical properties) of the photocurable composition is almost simultaneous.

DETAILED DESCRIPTION OF THE INVENTION

The invention may be more clearly understood by reference to the following detailed description which is nonlimiting but which merely exemplifies one of the preferred embodiments:

Figure 1:
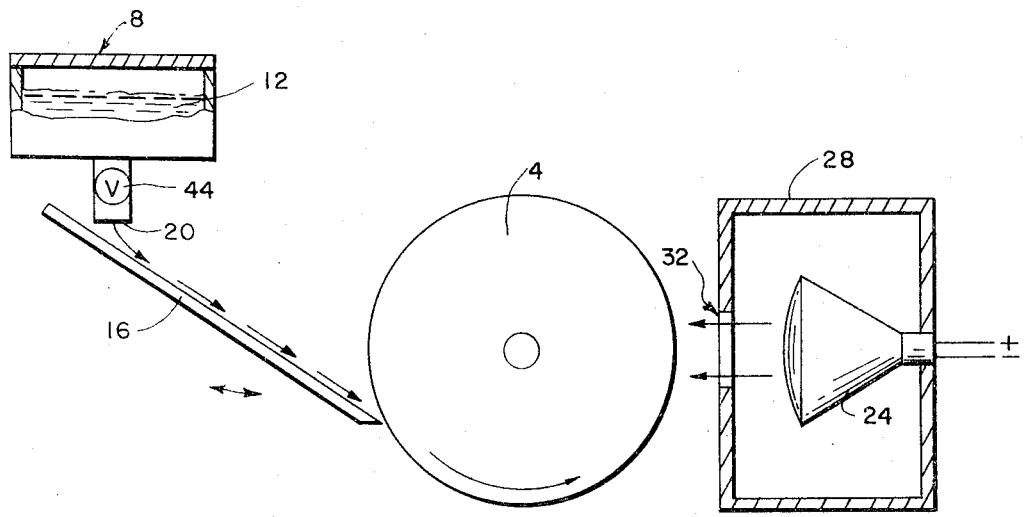
FIG. 1 is an end view, partially cross-sectional, of the apparatus before the coating process commences.
Figure 2:
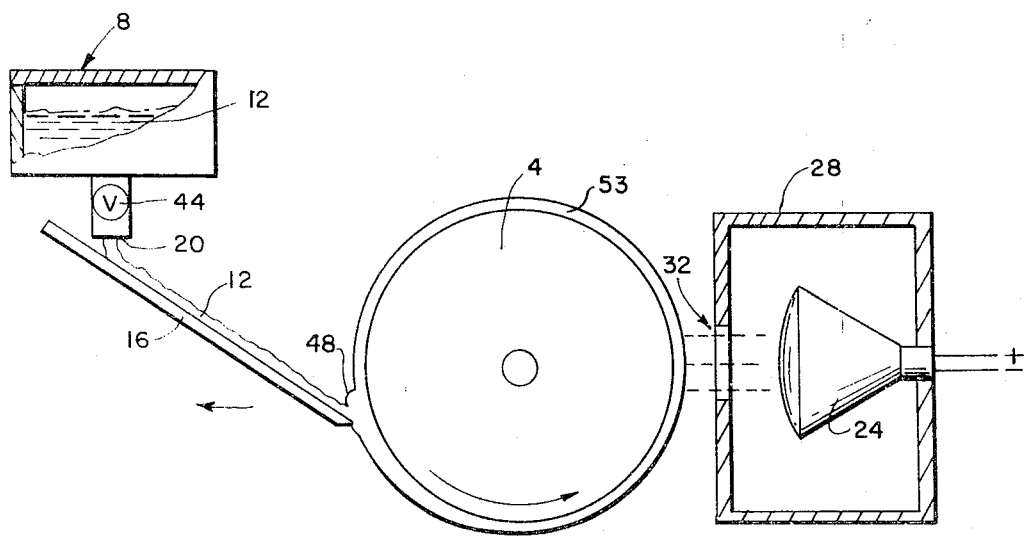
FIG. 2 is the same as FIG. 1 except that the coating process is in progress.
Figure 3:
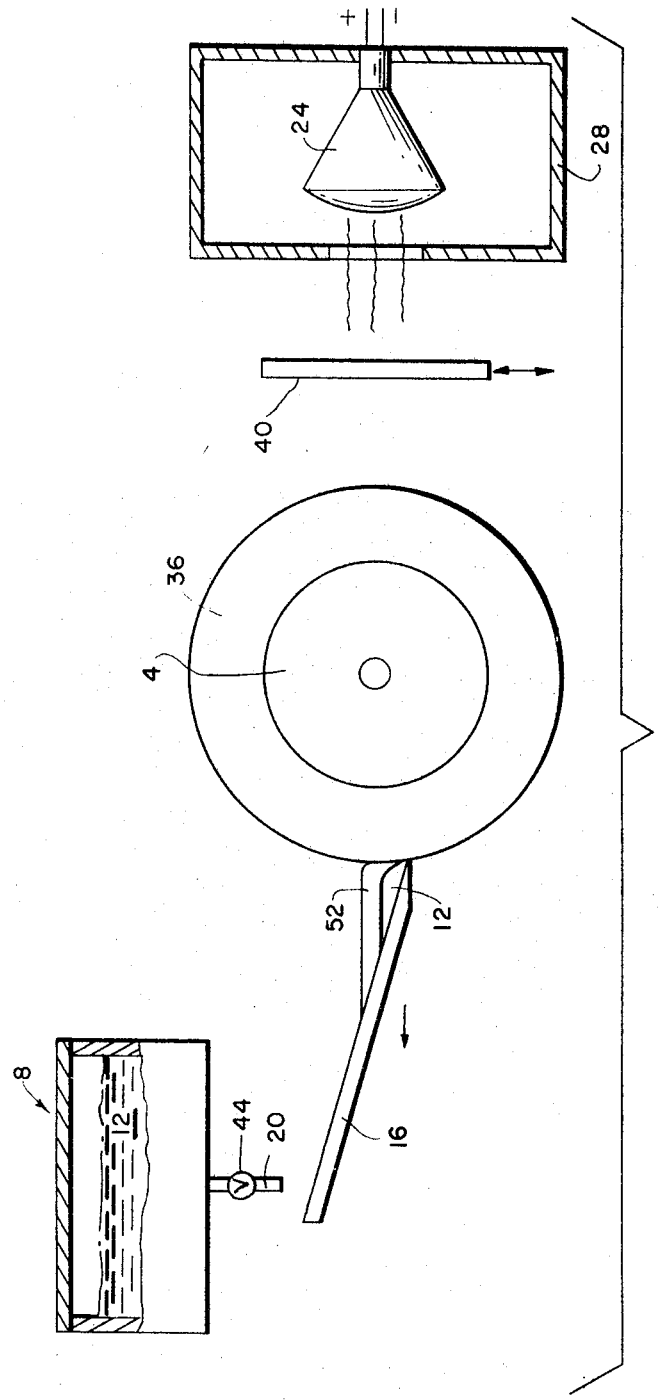
FIG. 3 is the same as FIG. 1 except that one embodiment the glossy finish coating process is starting.

Referring to FIG. 1, roller core 4 rotates in a counterclockwise direction. The mounting and moving means (not shown) for roller core 4 is any conventional device capable of rotating the core about its own axis (e.g., it is mounted on a lathe). Roller core 4 (1.0-inch diameter by 10 inches) can be cleaned before coating, and, in cases of metal rollers comprised of steel, can be sandblasted prior to mounting to remove any rust and to expose a clean and slightly roughened coating surface. Adhesive bonding agents or primers may be applied if desired to impart good adhesion of the photocurable composition to the core surface. Reservoir 8, which may be heated if desired, contains photocurable composition 12. (After photocurable composition 12 is prepared, it must be stored in a dark area, i.e., in the absence of ultraviolet light.) Delivery tray 16 is in a slightly sloping position, with the lower end (delivery lip) about 2 to 20 mils from the surface of roller core 4 during operation and start up (as shown in FIG. 2) and with the upper end (receiving portion) positioned under delivery throat 20 of reservoir 8. A plurality of delivery throats, etc., can be used to insure that there is coverage over the entire roller length. Photocurable composition 12 is gravity fed down delivery tray 16. Delivery tray 16 is moveable in a horizontal manner in relationship to roller core 4. Also delivery tray 16 has sidewalls (not shown) to prevent lateral overflow. U.V. light source 24 (e.g., one or several 275-watt Westinghouse RS sunlamps, is located so that its irradiating face is about 1.5 inches from the surface of roller core 4. Several sunlamps can be used, or a long tubular lamp could be used if desired. Shield 28 encompasses light source 24, except that slit 32 (0.75 inch by 10 inches) allows the ultraviolet light to be beamed directly onto the surface of roller core 4 without exposing photocurable composition 12 in delivery tray 16. The ultraviolet light can be kept from exposing any photocurable composition coated on roller core 4 and coating 36 by means of moveable shield (shutter) 40 (shown in FIG. 3) or by turning it off.

In operation, roller core 4 is typically rotating at about 10 r.p.m. Valve 44 is opened in such a manner as to properly control the amount of photocurable composition 12 flowing down delivery tray 16. Light source 24 is activated. As photocurable composition 12 contacts the surface of rotating roller core 4, it adheres thereto as a layer (i.e., coating 53 as in FIG. 2). It is seen that since the direction of rotation of roller core 4 is counterclockwise, the lip delivery tray 16 serves as a doctor blade to control the thickness of the applied coating on each pass. During the coating operation, "rolling bank" 48 of viscous photocurable composition 12 is preferably maintained in the end of delivery tray 16 against the surface of core 4. As the uncured coating passes U.V. light source 24, it is photocured. The coating thickness can be increased by applying another coating of uncured photocurable composition 12 on photocured composition 12 by moving the edge of delivery tray 16 slowly away from coated roller core 4. Coating thicknesses as great as about 2.0 or more inches can be obtained, and customary total thicknesses up to about 0.5 to 1.0 inch are easily obtained. After achieving the desired coating thickness, delivery tray 16 is retracted away from the coated surface of roller core 4. The roller can be rotated for several seconds to several minutes thereafter to insure a complete photocure of the coating of photocurable composition 12. The coatings are essentially nontacky and are usually applied in less than 15 to 30 minutes of total operating time, depending on the ultimate coating thickness, the intensity of the light source, etc., U.V. light source 24 is then prevented from shining on coating 36 by means of shield 40 or by turning it off. In the preferred embodiment, shown in FIG. 3, some of photocurable composition 12 is placed at the end of delivery tray 16 that has been situated very close (or tightly against if the rotation of the roller has been stopped) coating 36. Solvent 52 is placed on top of the photocurable composition 12 on delivery tray 16. This combination is applied on top of coating 36 in a manner similar to the one described above for coating roller 4. Light source 24 is allowed to photocure the coated and diluted photocurable composition. In this and other embodiments, it is preferred the light source be shut off while the diluted photocurable composition is applied so that premature photocuring does not occur. A glossy finish is obtained. The mixing action of the rotating roller blended composition 12 with solvent 52. In another embodiment the last coating is done similarly with premixed composition 12 and solvent 52. Also, the dilution of composition 12 can be progressive in that greater amounts of solvent 52 are constantly added to the composition 12—solvent 52 material being coated. In still another embodiment another reservoir is used which contains both composition 12 and solvent 52, and the coating procedure is similar to the above coating procedure for composition 12. Glossy finishes are obtained in each embodiment.

The photocurable composition to form the outer glossy finish can be diluted to the proper dilution range with a large number of solvents, but toluene is the preferred solvent. Other suitable solvents include isopropanol, propanol, methanol, ethanol, benzene, acetone, water, methyl ethyl ketone, cellosolve, butyl cellosolve, hexane, methylene chloride, etc. The solvent must be readily miscible with or emulsified with the photocurable material, yet have little action on the photocured portion of the roller. Most of the solvent occurs during the rotation of the roller before the photocuring occurs. The photocuring of the glossy finish accomplishes some of the evaporation, including the photocuring after the composition application has been finished. The remaining solvent must readily evaporate after the glossy finish is applied, even if some external heat must be applied.

The dilution ratio (weight-to-weight basis) of solvent to photocurable composition should be at least 0.25:1 and preferably should be greater than 2:1. The solvent is added to the bank in such a manner that the solvent content gradually increases to nearly 100 percent as the photocurable composition is used up.

The photocurable composition, as the main portion of the roller coating and/or as the outer glossy finish, can be added at elevated temperatures.

The core is typically constructed of a metal, e.g., aluminum, copper, steel, etc., but also can be constructed of a nonmetallic substance. The core can be a solid cylinder, a porous sintered cylinder, a hollow pipe or tube, a porous polymeric structure, etc. An example of a porous structure is a filament wound spindle. Because of the low temperature and pressure used during the photocuring step, the core can be made from materials which cannot withstand the prolonged heating used with heat curable roller coatings such as those derived from wood, cardboard, synthetic plastics, fiber-reinforced composites, foamed resins or elastomers, etc.

The method of applying the photocurable composition to the roller core (cylinder) is not critical, and can also, typically, be a forced-feed mechanism such as the use of a roller transfer to the core, an extrusion transfer, a curtain coating a knife coating, etc. Also a dip coating or spray coating technique can be used when the photocurable composition is of a relatively low viscosity.

The photocuring means is an actinic radiation source. It can be an ultraviolet radiation source that is composed of one or more individual U.V. sources, e.g., a sun lamp, mercury vapor lamp, carbon arc, pulsed xenon arc, etc., several batteries of individual sources, and so forth. Other actinic electromagnetic or ionizing radiation sources can be used, e.g., electron beams, gamma rays, lasers, visible radiation sources, infrared radiation sources, etc., if the coating composition is formulated properly so that satisfactory rates of curing can be attained therewith, and if the radiation can be so directed, focused, or collimated by shielding or the like so as to photocure the coating on the core but not the feed stream, etc.

The preferred coating substance is a photocurable composition, and particularly those having elastomeric properties in the photocured state.

The crucial ingredients in the preferred photocurable composition are:

1. about 2 to about 98 parts by weight of an ethylenically unsaturated polyene (or polyyne) containing two or more reactive unsaturated carbon-to-carbon bonds;

2. about 98 to about 2 parts by weight of a polythiol; and 3. about 0.0005 to about 50 parts by weight [based on 100 parts by weight of (1) and (2)] of a photocuring rate accelerator.

It is understood, however, that when energy sources other than visible or ultraviolet light are used to initiate the curing reaction, photocuring rate accelerators (i.e., photosensitizers, etc.) generally are not required in the formulation. That is to say, the actual composition of the photocuring rate accelerator, if required, may vary with the type of energy source that is used to initiate the curing reaction.

The reactive carbon-to-carbon bonds of the polyenes are preferably located terminally, near terminally, and/or pendant from the main chain. The polythiols, preferably, contain two or more thiol groups per molecule. The photocurable compositions are liquid (i.e., flowable) over the temperature range provided during the application to the rotating core.

Included in the term "liquid," as used herein, are those photocurable compositions which in the presence of inert solvent, aqueous dispersion or plasticizer have a viscosity ranging from slightly above 0 to 20 million centipoises at 130° C. The term "liquids" includes suspensions, etc.

As used herein polyenes and polyynes refer to simple or complex species of alkenes or alkynes having a multiplicity, i.e., at least two, "reactive" carbon-to-carbon unsaturated functional groups per average molecule. For example, a diene is a polyene that has two "reactive" carbon-to-carbon double bonds per average molecule, while a diyne is a polyyne that contains in its structure two "reactive" carbon-to-carbon triple bonds per average molecule. Combinations of "reactive" carbon-to-carbon triple bonds within the same molecule are also operable. An example of this is monovinylacetylene, which is a polyeneyne under our definition. For purposes of brevity all these classes of compounds will be referred to herein as polyenes.

As used herein the term "reactive" unsaturated carbon-to-carbon groups means groups which will react under proper conditions as set forth herein with thiol groups to yield the thioether linkage

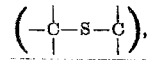

as contrasted to the term "unreactive" carbon-to-carbon unsaturation which means

groups when found in aromatic nuclei (cyclic structures exemplified by benzene, pyridine, anthracene, and the like) which do not under the same conditions react with thiols to give thioether linkages. In the instant invention products from the reaction of polyenes with polythiols which contain two or more thiol groups per average molecule are called polythioether polymers or polythioethers.

Methods of preparing various polyenes, with the limitations set forth herein, useful within the scope of this invention are disclosed in copending application Ser. No. 674,773, filed Oct. 12, 1967 now abandoned, and assigned to the same assignee. Some of the useful polyenes are prepared in the detailed examples set forth in the following specification. The general formulas for several, useful, representative polyenes and polyynes are given in the Figures in Dutch (Holland) application Ser. No. 67/10439 which was laid open to public inspection and copying thereof on Jan. 29, 1969 (said pertinent portions of said public document being incorporated herein by reference).

One group of polyenes, with the limitations set forth herein, operable in the instant invention is that taught in a copending application having Ser. No. 617,801, inventors: Kehr and Wszolek, filed Feb. 23, 1967, and assigned to the same assignee. This group includes those having a molecular weight in the range of 50 to 20,000, a viscosity ranging from 0 to 20 million centipoises at 70° C. of the general formula: $[A]-(X)_m$, wherein X is a member of the group consisting of $$R-\overset{R}{\underset{|}{C}}=\overset{R}{\underset{|}{C}}-$$

and $R-C\equiv C-$; $m$ is at least 2; R is independently selected from the group consisting of hydrogen, halogen, and an organic compound selected from the group consisting of aryl, substituted aryl, cycloalkyl, substituted cycloalkyl, aralkyl, substituted aralkyl, alkyl and substituted alkyl groups containing one to four carbon atoms; and A is a polyvalent organic moiety free of (1) reactive carbon-to-carbon unsaturation and (2) unsaturated groups in conjugation with the reactive ene or yne groups in X. Thus A may contain cyclic groupings and minor amounts of heteroatoms such as N,S, P or O but contains primarily carbon-carbon, carbon-oxygen or silicon-oxygen containing chain linkages without any reactive carbon-to-carbon unsaturation. This group preferably has a weight over 300.

In this first group, the polyenes are simple or complex species of alkenes or alkynes having a multiplicity of pendant, terminally or near terminally positioned "reactive" carbon-to-carbon unsaturated functional groups per average molecule. As used herein for determining the position of the reactive functional carbon-to-carbon unsaturation, the term "terminal" means that said functional unsaturation is at an end of the main chain in the molecule; whereas by "near terminal" is meant that the functional unsaturation is not more than four carbon atoms away from an end of the main chain in the molecule. The term "pendant" means that the reactive carbon-to-carbon unsaturation is located terminally or near terminally in a branch of the main chain as contrasted to a position at or near the ends of the main chain. For purposes of brevity all of these positions will be referred to generally as "-terminal" unsaturation.

The liquid polyenes operable in this first group contain one or more of the following types of nonaromatic and nonconjugated "reactive" carbon-to-carbon unsaturation:

| | | | |
|---|---|---|---|
| (1)..... | —CH=CH— | (5).... |  |
| (2)..... | —CH≡C— | (6).... | —C=CH—<br>\| |
| (3)..... | —CH=CH₂ | (7).... | —CH=C—<br>\| |
| (4)..... | —C≡CH | (8).... | —C=CH₂<br>\| |

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to nonreactive species, such as

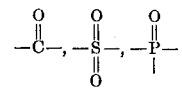

and the like, so as to form a conjugated system of unsaturated bonds exemplified by the structure:

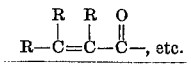

On the average the polyenes must contain two or more "reactive" unsaturated carbon-to-carbon bonds per molecule and have a viscosity in the range from slightly above 0 to about 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range of about 50 to about 20,000, preferably about 500 to about 10,000.

Examples of operable polyenes from this first group include, but are not limited to:

1. Crotyl-terminated polyurethanes which contain two "reactive" double bonds per average molecule in a near terminal position of the average general formula:

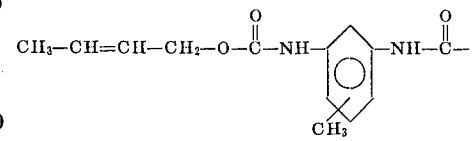

wherein $x$ is at least 1.

2. Ethylene/propylene/nonconjugated diene terpolymers, such as "Nordel 1040" manufactured by E. I. duPont de Nemours & Co., Inc., which contains pendant "reactive" double bonds of the formula; $-CH_2-CH = CH-CH_3$ 3. The following structure which contains terminal "reactive" double bonds:

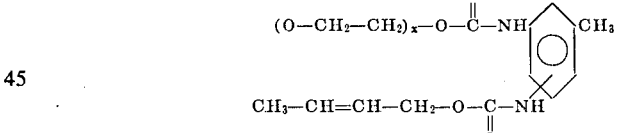

wherein $x$ is at least 1.

4. The following structure which contains near terminal "reactive" double bonds:

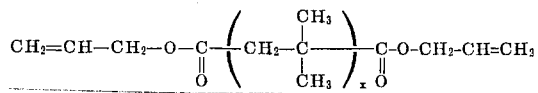

wherein $x$ is at least 1.

A second group of polyenes operable in this invention includes those polyenes in which the reactive unsaturated carbon-to-carbon bonds are conjugated with adjacent unsaturated groupings. Examples of operable conjugated reactive ene systems include but are not limited to the following:

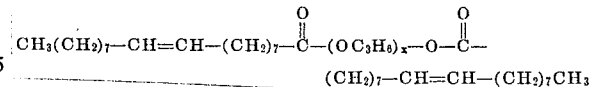

A few typical examples of polymeric polyenes which contain conjugated reactive double-bond groupings such as those described above are poly(oxyethylene) glycol (600 M.W.) diacrylate; poly(oxytetramethylene) glycol (1,000 M.W.) dimethacrylate; the triacrylate of the reaction product of trimethylol propane with 20 moles of ethylene oxide; and the like.

As used herein, the term polythiols refers to simple or complex organic compounds having a multiplicity of pendant or terminally positioned —SH functional groups per average molecule.

On the average the polythiols must contain two or more —SH groups per molecule. They usually have a viscosity range of slightly above 0 to about 20 million centipoises (c.p.s.) at 70° C., as measured by a Brookfield Viscometer. Included in the term "polythiols" as used herein are those materials which in the presence of an inert solvent, aqueous dispersion or plasticizer fall within the viscosity range set out above 70° C. Operable polythiols in the instant invention usually have molecular weights in the range about 50 to about 20,000, or more, preferably about 100 to about 10,000.

The polythiols operable in the instant invention can be exemplified by the general formulas: $R_a$—$(SH)_n$, wherein $n$ is at least 2 and $R_a$ is a polyvalent organic moiety free from "reactive" carbon-to-carbon unsaturation. Thus $R_a$ may contain cyclic groupings and minor amounts of heteroatoms such as N, S, P or O but primarily contains carbon-hydrogen, carbon-oxygen, or silicon-oxygen containing chain linkages free of any "reactive" carbon-to-carbon unsaturation.

One class of polythiols operable with polyenes in the instant invention to obtain essentially odorless compositions are esters of thiol-containing acids of the general formula: HS—$R_b$—COOH, wherein $R_b$ is an organic moiety containing no "reactive" carbon-to-carbon unsaturation with polyhydroxy compounds of the general structure: $R_c$—$(OH)_n$ wherein $R_c$ is an organic moiety containing no "reactive" carbon-to-carbon unsaturation and $n$ is 2 or greater. These components will react under suitable conditions to give a polythiol having the general structure:

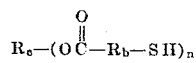

wherein $R_b$ and $R_c$ are organic moieties containing no "reactive" carbon-to-carbon" unsaturation and $n$ is 2 or more.

Certain polythiols, such as the aliphatic monomeric polythiols (ethane dithiol, hexamethylene dithiol, decamethylene dithiol, tolylene-2,4-dithiol, etc.), some polymeric polythiols, such as a thiol-terminated ethylcyclohexyl dimercaptan polymer, etc., and similar polythiols which are conveniently and ordinarily synthesized on a commercial basis, although having obnoxious odors, are operable in this invention. Examples of the polythiol compounds preferred for this invention because of their relatively low odor level and fast curing rate include but are not limited to esters of thioglycolic acid (HS—$CH_2COOH$), α-mercaptopropionic acid (HS—$CH(CH_3)$—COOH) and β-mercaptopropionic acid (HS—$CH_2CH_2COOH$) with polyhydroxy compounds such as glycols, triols, tetraols, pentaols, hexaols, etc. Specific examples of the preferred polythiols include but are not limited to ethylene glycol bis(thioglycolate), ethylene glycol bis(β-mercaptopropionate), trimethylolpropane tris(thioglycolate), trimethylopropane tris(β-mercaptopropionate), pentaerythritol tetrakis(thioglycolate) and pentaerythritol tetrakis(β-mercaptopropionate), all of which are commercially available. A specific example of a preferred polymeric polythiol is poly(propylene ether) glycol bis(β-mercaptopropionate) which is prepared from poly(propylene ether) glycol (e.g., Pluracol P 2010, Wyndotte Chemical Corp.) and β-mercaptopropionic acid by esterification.

The preferred polythiol compounds are characterized by a low level of mercaptanlike odor initially, and after reaction give essentially odorless cured polythioether end products which are commercially useful resins or elastomers for printing plates.

As used herein the term "odorless" means the substantial absence of the well-known offensive and sometimes obnoxious odors that are characteristic of hydrogen sulfide and the derivative family of compounds known as mercaptans.

The term "functionality" as used herein refers to the average number of ene or thiol groups per molecule in the polyene and/or the polythiol. For example, a triene is a polyene with an average of three "reactive" carbon-to-carbon unsaturated groups per molecule and thus has a functionality of 3. A dithiol is a polythiol with an average of two thiol groups per molecule and thus has a functionality of 2.

It is further understood and implied in the above definitions that in these systems the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. Such a product is useful in the instant invention and is referred to herein as having a functionality of 2.

To obtain the maximum strength, solvent resistance, creep resistance, heat resistance and freedom from tackiness, the reaction components consisting of the polyenes and polythiols of this invention generally are formulated in such a manner as to give solid, cross-linked, three dimensional network polythioether polymer formation, the individual polyenes and polythiols must each have a functionality of at least 2 and the sum of the functionalities of the polyene and polythiol components must always be greater than 4. Blends and mixtures of the polyene and the polythiols containing said functionality are also operable herein.

The preferred photocuring reaction can be initiated by U.V. radiation contained in actinic radiation from sunlight or obtained from special light sources which emit significant amounts of U.V. light. (Useful U.V. radiation generally has a wavelength in the range of about 2,000 to about 4,000 angstrom units.) Thus it is possible merely to expose the polyene and polythiol admixture to actinic radiation under ambient conditions or otherwise and obtain a cured solid elastomeric or resinous product useful as a core coating material. But this approach to the problem results in extremely long exposure times which cause the process in the vast bulk of applications to be commercially unfeasible. Chemical photocuring rate accelerators (photoinitiators or photosensitizers or photoactivators) e.g., quinone, methyl ethyl ketone, etc., serve to drastically reduce the exposure time and thereby when used in conjunction with various forms of energetic radiation (containing U.V. radiation) yield very rapid, commercially practical photocures by the practice of the instant invention. Useful photocuring rate accelerators include benzophenone; acetophenone; acenapthenequinone; methyl ethyl ketone; thioxanthen-9-one; xanthen-9-one; 7-H-Benz[de]antracen-7-one; dibenzosubernone; 1-naphthaldehyde; 4,4′-bis(dimethylamino) benzophenone; fluorene-9-one; 1′-acetonaphthone; 2′-acetanaphthone; 2,3-butanedione; anthraquinone; 1-indanone; 2-tert-butyl anthraquinone; valerophenone; hexanophenone; 8-phenylbutyrophenone; p-morpholinopropiophenone; 4-morpholinobenzophenone; 4′-morpholinodesoxybenzoin; p-diacetylbenzene; 4-aminobenzophenone; 4′-methoxyacetophenone; benzaldehyde; α-tetralone; 9-acetylphenanthrene; 2-acetylphenanthrene; 10-thioxanthenone; 3-acetylphenanthrene; 3-acetylindole; 1,3,5-triacetylbenzene; etc., and blends thereof. The photoinitiators are added in an amount ranging from about 0.0005 to about 50 percent by weight of the polyene and polythiol components in the instant invention. Benzophenone is the preferred photocuring rate accelerator.

The compositions to be photocured, i.e., converted to roller core coatings, in accord with the present invention may, if desired, include such additives as antioxidants, inhibitors, activators, fillers, pigments, dyes, antistatic agents, flame-retardant agents, thickeners, thixotropic agents, surface-active agents, viscosity modifiers, plasticizers, and the like within the scope of this invention. Such additives generally are preblended with the polyene or polythiol prior to impregnating it in and/or on the ultimate structure. The aforesaid additives may be present in quantities up to 500 parts or more per 100 parts photocurable composition by weight and preferably 0.0005 to 300 parts on the same basis. The type and concentration of the additives must be selected with great care so that the final composition remains photocurable under conditions of exposure.

The compounding of the components prior to photocuring can be carried out in any conventional manner which takes into account that the material is sensitive to U.V. radiation. This composition generally can be stored in the dark for extended periods of time prior to actual use or even incorporation in and/or on the ultimate structure.

It is often desirable to place a suitable antioxidant, e.g., "Ionol," hydroquinone, t-butyl catechol, etc., in the photocurable composition. These agents in optimum amounts will help to stabilize the fully formulated composition against premature thickening or curing during periods of storage prior to the use in the coating process.

The above discussion about photocurable compositions applies to the photocurable compositions used in both coating layer and the finishing layer.

The following examples will aid in explaining, but should not be deemed as limiting, the instant invention. In all cases, unless otherwise noted, all parts and percentages are by weight.

EXAMPLE 1

3456.3 g. (1.75 mole) of poly(propylene ether) glycol, commercially available under the trade name "PPG 2025" from Union Carbide, and 1.7 g. of di-n-butyl tin dilaurate were placed in a 5-liter, round-bottom, three-neck flask. The mixture in the flask was degassed at 110° C. for 1 hour and was then cooled to 25° C. by means of an external water bath. Two hundred and seven grams (3.50 moles) of allyl alcohol, with stirring, were added to the flask. 609.0 g. (3.50 moles) of an 80 to 20 percent isomer mixture of tolylene-2,4-di-isocyanate and tolylene-2,6-diisocyanate, respectively, sold under the trade name "Mondur TD 80," was charged to the flask. The mixture was stirred well. The flask was cooled by the water bath during this period. Eight minutes after the "Mondur TD 80" was added, the temperature of the mixture was 59° C. After 20 minutes, the NCO content was 12.39 mg. NCO/g.; after 45 minutes, it was 9.87 mg. NCO/g.; and after 75 minutes, it was 6.72 mg. NCO/g. The water bath was removed 80 minutes after the "Mondur TD 80" had been added, the temperature of the mixture being 41° C., and heat was applied until the mixture temperature reached 60° C. That temperature was maintained. One hundred and five minutes after the "Mondur TD 80" was added, the NCO content was 3.58 mg. NCO/g.; after 135 minutes, it was 1.13 mg. NCO/g.; and after 195 minutes, it was 0.42 mg. NCO/g. At that point in time, the resultant polymer composition was heated to 70° C., and vacuum-stripped for 1 hour. The resultant polymer composition was labeled composition 1, and had a viscosity of 16,000 c.p.s. as measured on a Brookfield Viscometer at 30° C. Unless otherwise stated, all the viscosity measurements were made on a Brookfield Viscometer at 30° C.

The above procedure was repeated five times, and resultant compositions were labeled compositions 2 to 6, respectively. The heating step lasted 180 minutes, 140 minutes, 205 minutes and 180 minutes, respectively. With composition 2, the temperature was 60° C. after 8 minutes; with composition 3, the temperature was 57° C. after 6 minutes; with composition 4, the temperature was 41° C. after 20 minutes, at which time the temperature was raised and held at 60° C.; with composition 5, the temperature was 57.5° C. in 8 minutes, was 42° C. in 40 minutes, then taken up to 60° C. and lowered to 58° C. after 120 minutes; and with composition 6, the temperature was 57° C. in 6 minutes, and was 41° C. after 60 minutes, at which time the temperature was immediately raised to 60° C. The viscosity of the resultant polymer compositions was 15,500 c.p.s.; 16,000 c.p.s.; 17,000 c.p.s.; 16,800 c.p.s.; and 16,200 c.p.s. respectively.

Compositions 1, 2, 3, 4, 5 and 6 were placed in a 6-gallon container and stirred well. The resultant polymer composition had a viscosity of 16,000 c.p.s. and the NCO content was 0.01 mg. NCO/g. This composite polymer composition was labeled polyene A.

EXAMPLE 2

One hundred parts of polyene A, 10 parts of polythiol A, 1.5 parts of benzophenone and 0.1 part by weight of "Ionol" were thoroughly admixed. This resulted in photocurable composition A. Polythiol A was pentaerythritol tetrakis-(mercaptopropionate), which is commercially available under the trade name "Q-43 Ester" (sold by Carlisle Chemical Company). "Ionol" is a label designation for 2,6-di-tertbutyl-4-methylphenol (sterically hindered) and is commercially available from Shell Chemical Company. Ionol has good antioxidant properties, is nonirritating to the skin, and has a comparatively inert, nonacidic hydroxyl group.

Photocurable composition A was placed in a reservoir like the one shown in FIG. 1. The rest of the experiment was similar to that shown in FIG. 1 and 2 and the accompanying writeup above. The end of the delivery tray was placed about 20 mils away from the 1.0-inch diameter roll core (steel). The roller core was rotated at 10 r.p.m. The valve on the throat of the reservoir was opened. As the coating was applied to the roller core, the delivery tray was slowly moved (manually) away from the core. When the coating thickness reached about one-half inch, the delivery tray was completely backed away from the coated roller. The coated roller was further rotated for 3 minutes before a shutter was placed in front of the U.V. lamp to turn it off in effect. A coated roller was produced at this point.

The doctor blade portion of the delivery tray was put in nearly touching position with the photocured layer of the rotating coated roller. A batch of photocurable composition was placed at the end of the delivery tray, which formed a "rolling bank." (See FIG. 3) An equal volume amount of toluene was placed on top of the photocurable composition. The coated roller was rotated a few times to mix the solvent and photocurable composition. As the diluted coating was applied to the coated roller, the delivery tray was slowly moved (manually) away from the coated roller. After a 20-mil additional retractor the delivery tray was completely backed away from the coated roller. The roller was further rotated for 1 minute to allow partial evaporation of the solvent. The shutter or shield in front of the U.V. lamp was removed and the finishing layer was photocured for 3 minutes. The resultant coated roller had a smooth glazelike essentially faultless finish. The final hardness of the coating was measured at Shore A 50 (ASTM).

EXAMPLES 3 to 9

Example 2 was repeated seven times, except that the toluene was replaced with isopropanol (1:1) (example 3), ethanol (2:1) (example 4), methyl ethyl ketone (1:1) (example 5), methylene chloride (1:3) (example 6), benzene (2:1) (example 7), acetone (1:1) (example 8) and butyl cellosolve (1:1) (example 9), respectively. The above ratios are expressed on a weight basis of the solvent to photocurable composition. The resultant photocured coating had a smooth, uniform, glazelike finish.

EXAMPLE 10

Example 2 was repeated, except that the finish layer was photocured immediately after that solvent diluted layer was applied. The resultant photocured finish was not quite as good as the one obtained in example 2.

EXAMPLE 11

Example 2 was repeated except that 15 parts of polythiol A was used. The resultant photocured coating had a smooth, uniform, glazelike finish.

EXAMPLES 12 to 15

Example 2 was repeated four times, except that the pentaerythritol tetrakis (β-mercaptopropionate) was replaced with trimethylolpropane tris(β-mercaptopropionate) (10 parts) (example 12), trimethylolpropane tris(thioglycolate) (15 parts) (example 13), pentaerythritol tetrakis (thioglycolate) (5.0 parts) (example 14), poly(propylene ether) triol tris(β-mercaptopropionate) of M.W. 3,400 (100 parts) (example 15), respectively. The resultant photocured coatings had smooth, uniform, glazelike finishes.

EXAMPLE 16

Example 2 was repeated, except that half of the pentaerythritol tetrakis(β-mercaptopropionate) was replaced with 5 parts of ethylene glycol bis(β-mercaptopropionate). The resultant photocured coating had a smooth, uniform, glazelike finish.

EXAMPLE 17

Example 2 was repeated except that 60 parts of polyene B was used in place of polyene A. Polyene B was prepared as follows: 458 g. (0.23 mole) of a commercially available liquid polymeric diisocyanate sold under the trade name "Adiprene L–100" by E. I. duPont de Nemours & Co. was charged to a dry resin kettle maintained under a nitrogen atmosphere and equipped with a condenser, stirrer, thermometer, and gas inlet and outlet. 37.8 g. (0.65 mole) of allyl alcohol was charged to the kettle and the reaction was continued for 17 hours with stirring at 100° C. Thereafter the nitrogen atmosphere was removed and the kettle was evacuated 8 hours at 100° C. 50 cc. dry benzene was added to the kettle and the reaction product was azeotroped with benzene to remove the unreacted alcohol. This allyl-terminated liquid polymer had a molecular weight of approximately 2,100 and was labeled polyene B.

The resultant photocured coating had a smooth, uniform, glazelike finish.

EXAMPLE 18

Example 2 was repeated except that 100 parts of polyene C was used in place of polyene A. Polyene D was prepared as follows: 1,500 g. (0.47 mole) of a linear solid polyester diol having a molecular weight of 3,200 and commercially available from Hooker Chemical Corp. under the trade name "Rucoflex S–1011–35" was charged to a 3-liter, three-necked flask and heated to 110° C. under vacuum and nitrogen for 1 hour with stirring. Eighty-three grams of allyl isocyanate having a molecular weight of 83.1 and commercially available from Upjohn Co. was added to the flask along with 0.3 cc. of dibutyl tin dilaurate (catalyst), commercially available from J. T. Baker Co. The reaction was continued at 110° C. with stirring for 1 hour. This allyl-terminated polymer was labeled polyene C.

The resultant photocured coating had a smooth, uniform glazelike finish.

EXAMPLE 19 to 24

Example 2 was repeated six times, except that the benzophenone was replaced with cyclohexanone (2.0 parts) (example 19), acetone (1 part) (example 20), methyl ethyl ketone (3.0 parts) (example 21), dibenzosuberone (0.5 part) (example 22), a blend of acetone (0.3 part) and p-diacetylbenzene (0.6 part) (example 23), and 3-acetylphenanthrene (1 part) (example 24), respectively. The resultant photocured coatings had smooth, uniform, glazelike finishes.

EXAMPLES 25 and 26

Example 2 was repeated twice, except that the rolled core was constructed of copper and fiber glass reinforced polyester resin, respectively. The resultant photocured coatings had smooth, uniform, glazelike finishes.

EXAMPLE 27

This example illustrates the use of a monomeric polythiol and a monomeric polyene. 23.8 g. of pentaerythritol tetrakis(β-mercaptopropionate); 25.6 g. of the reaction product of 1 mole of 1,4-butanediol with 2 moles of allyl isocyanate; and 0.5 g. of benzophenone were thoroughly admixed. Example 1 was repeated, except that the above photocurable composition was used in place of photocurable composition A. The resultant photocured coating had a smooth, uniform, glazelike finish.

EXAMPLE 28

This example illustrates the use of a reactive ene group conjugated with another double-bond grouping (C=O). Twenty-seven grams of the triacrylate of the reaction product of 1 mole of trimethylol propane with 20 moles of ethylene oxide; 9 g. of pentaerythritol tetrakis(β-mercaptopropionate); and 0.5 g. of benzophenone were thoroughly admixed. Example 1 was repeated, except that the above photocurable composition was used in place of photocurable composition A. The resultant photocured coating had a smooth, uniform, glazelike finish.

EXAMPLE 29

Example 1 was repeated, except that the photocuring composition used in diluted form to prepare the finishing layer was the photocurable composition used in example 28. The resultant photocured coating had a smooth, uniform, glazelike finish.

EXAMPLE 30

This example illustrates the use of a photocurable composition containing a monomeric polyene and a polymeric polythiol. Fifty grams of "Dion Polymercaptan Resin DPM–1002" which is a thiol terminated liquid polymer having a functionality of 2 to 3 and a molecular weight of about 5,000 and commercially available from Diamond Alkali Company; 2.5 g. of triallyl cyanurate; and 0.5 g. of benzophenone were admixed. Example 2 was repeated, except that the above photocurable composition was used in place of photocurable composition A. The resultant photocured coating had a smooth, uniform, glazelike finish.

EXAMPLE 31

This example illustrates the use of a photocurable composition containing a polymeric polyene and a polymeric polythiol. Example 2 was repeated, except that the photocurable composition contained 50 parts of the polymeric polyene used in example 16; 100 parts of the polymeric polythiol used in example 27; and 0.5 part of benzophenone. The resultant photocured coating had a smooth, uniform, glazelike finish.

EXAMPLE 32

Example 2 was repeated, except that as the toluene-diluted photocurable material was coated, more toluene was added until nearly pure toluene was being coated. The resultant photocured coating had a smooth, uniform, glazelike finish.

EXAMPLE 33

Example 2 was repeated, except that the toluene-diluted photocurable material was admixed, placed in a reservoir and coated in the same manner as was the undiluted photocurable composition. The resultant photocured coating had a smooth, glazelike finish.

EXAMPLE 34

Example 2 was repeated, except that the photocurable composition contained phthalocyanine blue as a pigment. The resultant photocured coating had a smooth, glazelike finish.

EXAMPLE 35

Example 2 was repeated up to the point where there was only a small amount of photocurable composition A was left to be coated. The solvent used in example 2 was then slowly added to the "rolling bank" of photocurable composition A. The solvent-diluted composition was then further coated as in example 2. The resultant photocured coating had a smooth, uniform, glazelike finish.

What is claimed is:

1. A process for preparing a coated cylindrical core, said coating having a smooth glazelike finish, which comprises:
   a. coating a first photocurable composition on a rotating cylindrical core;
   b. photocuring said photocurable composition coating on said rotating cylindrical core to form a photocured layer whereby said photocuring is achieved by subjecting said photocurable composition to actinic radiation;
   c. coating a second photocurable composition which is diluted relative to said first composition with a solvent on said photocured layer on said rotating cylindrical core; and
   d. photocuring said solvent-diluted photocurable composition, whereby said photocuring is achieved by subjecting said photocurable composition to actinic radiation and whereby a smooth glazelike finish layer is formed on said photocured coating layer, said layers being essentially one monolithic layer and said solvent having substantially evaporated from said finish layer.

2. A process as described in claim 1 wherein said photocuring is achieved by means of ultraviolet radiation 3. A process as described in claim 1 wherein said photocuring is achieved by means of electron beam radiation.

4. A process as described in claim 1 wherein said solvent is toluene.

5. A process as described in claim 1 wherein said coated roller containing said photocurable finishing layer is rotated for a period of time between steps (c) and (d), whereby a substantial portion of said solvent evaporates before step (d) is conducted.

6. A process as described in claim 1 wherein said coating step (a) and said photocuring step (b) occur simultaneously, said photocuring occurring in the freshly coated layer and in several previously coated layers.

7. A process as described in claim 1 wherein said photocurable composition used in step (a) and step (c) comprises an ethylenically unsaturated polyene having at least two reactive ene groups per molecule, a polythiol containing two or more thiol groups per molecule, and a photocuring rate accelerator, where the sum of the functionalities of said polyene and said polythiol is greater than 4.

8. A process as described in claim 7 wherein the photocurable composition in said photocurable layer is comprised of 2 to 98 parts by weight of said polyene, 98 to 2 parts by weight of said polythiol, and 0.0005 to 50 parts by weight photocuring rate accelerator based on 100 parts by weight of said polyene and said polythiol.

9. A process as described in claim 8 wherein said polyene composition has a molecular weight in the range of 50 to 20,000; has a viscosity ranging from essentially 0 to 20 million centipoises at 130° C.; and has a general formula: $[A]-(X)_m$ wherein X is a member of the group consisting of

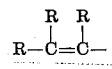

and $R-C\equiv C-$; $m$ is an integer of at least 2; R is independently selected from the group consisting of hydrogen, halogen, and an organic compound selected from the group consisting of aryl, substituted aryl, aralkyl, substituted aralkyl, cycloalkyl, substituted cycloalkyl, alkyl and substituted alkyl groups containing one to four carbon atoms; and A is a polyvalent polymeric organic moiety free of (1) reactive carbon-to-carbon unsaturation, and (2) unsaturated groupings in terminal conjugation with X.

10. A process as described in claim 8 wherein the polyene has a molecular weight in excess of 300.

11. A process as described in claim 8 wherein the photocurable composition contains 0.0005 to 5.0 parts by weight of an antioxidant, 0.05 to 25 parts by weight of a pigment, 1.0 to 50 parts by weight of a plasticizer, and 0.5 to 100 parts by weight of a filler, each of said ingredients being based upon 100 parts by weight of said polyene and said polythiol.

12. A process as described in Claim 11 wherein said antioxidant is 2,6-di-tert-butyl-4-methylphenol.

13. A process as described in claim 8 wherein the two or more reactive ene groups are located terminally in the molecule or where the two or more reactive ene groups are conjugated with other unsaturated groups.

14. A process as described in claim 8 wherein the said polythiol has a molecular weight between about 50 and about 20,000, and has a viscosity between slightly above 0 and about 20 million centipoises at 70° C.

15. A process as described in claim 8 wherein said polyene is prepared from allyl alcohol, polyalkylene ether glycol and tolylene diisocyanate.

16. A process as described in claim 7 wherein the same photocurable composition is used in step (a) and step (c).

17. A process as described in claim 7 wherein different photocurable compositions are used in step (a) and step (c).

18. An article of manufacture which comprises (i) a cylindrical core, (ii) a photocured coating layer and (iii) a photocured smooth, glazelike finishing layer, said layer (ii) and said layer (iii) being essentially one monolithic layer.

* * * * *